US012266465B2

(12) United States Patent
Lin et al.

(10) Patent No.: US 12,266,465 B2
(45) Date of Patent: Apr. 1, 2025

(54) MANUFACTURING METHOD OF A TRANSFORMER

(71) Applicant: CHAMPION MICROELECTRONIC CORP., Hsinchu (TW)

(72) Inventors: Pao Wei Lin, Hsinchu (TW); Wei Liang Lin, Taichung (TW); Pei Wang, New Taipei (TW); Jia Yao Lin, Tainan (TW); Yu Ting Chen, Taichung (TW); Chien-Chih Lai, Taichung (TW)

(73) Assignee: Champion Microelectronic Corp., Hsinchu (TW)

( * ) Notice: Subject to any disclaimer, the term of this patent is extended or adjusted under 35 U.S.C. 154(b) by 719 days.

(21) Appl. No.: 17/456,718

(22) Filed: Nov. 29, 2021

(65) Prior Publication Data

US 2023/0007928 A1 Jan. 12, 2023

(30) Foreign Application Priority Data

Jul. 6, 2021 (TW) ................................ 110124707

(51) Int. Cl.

| | |
|---|---|
| ***H01F 7/06*** | (2006.01) |
| ***H01F 27/28*** | (2006.01) |
| ***H01F 27/32*** | (2006.01) |
| ***H01F 41/06*** | (2016.01) |

(52) U.S. Cl.

CPC ....... *H01F 27/2823* (2013.01); *H01F 27/325* (2013.01); *H01F 41/06* (2013.01)

(58) Field of Classification Search

CPC ............. H01F 27/2823; H01F 27/2828; H01F 27/325; H01F 41/06; H01F 41/076

See application file for complete search history.

(56) References Cited

U.S. PATENT DOCUMENTS

| | | | | |
|---|---|---|---|---|
| 6,937,129 | B2 * | 8/2005 | Hsueh | H01F 41/082 336/212 |
| 8,159,323 | B2 * | 4/2012 | Sugimura | H01F 27/326 336/221 |
| 9,929,640 | B2 * | 3/2018 | Kim | H01F 3/14 |

FOREIGN PATENT DOCUMENTS

| | | | |
|---|---|---|---|
| CN | 212365712 | U | 1/2021 |
| TW | M620509 | U | 12/2021 |

OTHER PUBLICATIONS

Search Report Issued by International Patent Office for Application No. 11120654700/110124707.

* cited by examiner

*Primary Examiner* — Paul D Kim

(74) *Attorney, Agent, or Firm* — Rosenberg, Klein & Lee

(57) ABSTRACT

A manufacturing method of a transformer includes: winding a first winding wire around a bobbin, wherein two ends of the first winding wire are connected to a first and a second pin of the bobbin respectively; winding a second winding wire around the bobbin, wherein two ends of the second winding wire are connected to a third and a fourth pin of the bobbin respectively; and winding a third and a fourth winding wire in parallel around the bobbin, wherein two ends of the third winding wire are connected to the second and a fifth pin of the bobbin respectively, and two ends of the fourth winding wire are connected to the fifth and a sixth pin respectively. The first, the third and the fourth winding wires form a primary coil, and the second winding wire is a secondary coil.

2 Claims, 8 Drawing Sheets

MANUFACTURING METHOD OF A TRANSFORMER

This application claims priority of Application No. 110124707 filed in Taiwan on 6 Jul. 2021 under 35 U.S.C. § 119; the entire contents of all of which are hereby incorporated by reference.

BACKGROUND OF THE INVENTION

Field of the Invention

The present invention relates to a transformer and a manufacturing method thereof.

Description of the Prior Art

A transformer at least includes a primary coil and a secondary coil, and a ratio of the number of turns of the primary coil to the secondary coil determines a voltage ratio of the transformer. There are many kinds of windings for the transformer, one of which is the sandwich winding. FIG. 1 shows a front view and a back view of a bobbin 12 of a transformer. FIGS. 2 to 4 show the traditional sandwich winding. FIG. 5 is a cross-section view of a transformer 10. As shown in FIG. 1, a bobbin 12 of the transformer has a plurality of pins 14, 16, 18, 20, 22 and 24. After one end of a winding wire 26 is connected to the pin 14, the winding wire 26 is wound around the bobbin 12 for at least one turn, as shown in FIGS. 2 and 5. After the winding wire 26 is wound around the bobbin 12 for a preset number of turns, the other end of the winding wire 26 is connected to the pin 16. Subsequently, as shown in FIGS. 3 and 5, after the winding wire 26 is wound, an insulation material 28 such as an adhesive insulation tape is arranged on the winding wire 26 on the bobbin 12. After the insulation material 28 is arranged, one end of a winding wire 30 is connected to the pin 24, and the winding wire 30 is wound around the bobbin 12 for at least one turn. After the winding wire 30 is wound around the bobbin 12 for a preset number of turns, the other end of the winding wire 30 is connected to the pin 22. Finally, as shown in FIGS. 4 and 5, after the winding wire 30 is wound, an insulation material 32 such as an adhesive insulation tape is arranged on the winding wire 30 on the bobbin 12. After the insulation material 32 is arranged, one end of a winding wire 34 is connected to the pin 16, and the winding wire 34 is wound around the bobbin 12 for at least one turn. After the winding wire 34 is wound around the bobbin 12 for a preset number of turns, the other end of the winding wire 34 is connected to the pin 18 to form the transformer 10. In the transformer 10, the winding wires 26 and 34 form a primary coil of the transformer 10, and the winding wire 30 forms a secondary coil of the transformer 10.

However, the electromagnetic interference (EMI) of the transformer 10 manufactured by traditional sandwich winding has a poorer performance. As shown in FIG. 6, an EMI quasi-peak strength curve 44 generated from the transformer 10 may exceed a regulation line 40 of CISPR22 Class-B (QP), EE55022 Class-B (QP) or EE55032 Class-B (QP), and an EMI average strength curve 46 generated from the transformer 10 may exceed a regulation line 42 of CISPR22 Class-B (AV), EE55022 Class-B (AV) or EE55032 Class-B (AV).

SUMMARY OF THE INVENTION

One of objectives of the present invention is to provide a transformer and a manufacturing method thereof.

One of objectives of the present invention is to provide a transformer with sandwich winding and a manufacturing method thereof.

According to the present invention, a manufacturing method of a transformer includes: connecting one end of a first winding wire to a first pin of a bobbin; connecting the other end of the first winding wire to a second pin of the bobbin after winding the first winding wire around the bobbin for at least one turn; connecting one end of a second winding wire to a third pin of the bobbin; connecting the other end of the second winding wire to a fourth pin of the bobbin after winding the second winding wire around the bobbin for at least one turn; connecting one end of a third winding wire to the second pin of the bobbin, and connecting one end of a fourth winding wire to a fifth pin of the bobbin; and connecting the other end of the third winding wire to the fifth pin of the bobbin and connecting the other end of the fourth winding wire to a sixth pin of the bobbin after winding the third winding wire and the fourth winding wire around the bobbin in parallel for at least one turn. The first winding wire, the third winding wire and the fourth winding wire form a primary coil of the transformer, and the second winding wire is a secondary coil of the transformer.

According to the present invention, a transformer includes a bobbin, a first winding wire, a second winding wire, a third winding wire and a fourth winding wire. The bobbin has a first pin, a second pin, a third pin, a fourth pin, a fifth pin and a sixth pin. The first winding wire is wound around the bobbin, and two ends of the first winding wire are connected to the first pin and the second pin respectively. The second winding wire is wound around the bobbin, and two ends of the second winding wire are connected to the third pin and the fourth pin respectively. The third winding wire is wound around the bobbin, and two ends of the third winding wire are connected to the second pin and the fifth pin respectively. The fourth winding wire is wound around the bobbin, and two ends of the fourth winding wire are connected to the fifth pin and the sixth pin respectively. The third winding wire and the fourth winding wire are wound in parallel around the bobbin simultaneously. The first winding wire, the third winding wire and the fourth winding wire form a primary coil of the transformer, and the second winding wire is a secondary coil of the transformer.

In the present invention, the third winding wire and the fourth winding wire are wound in parallel, and then the third winding wire and the fourth winding wire are connected with each other in series, thereby further improving the EMI performance of the transformer.

DESCRIPTION OF THE PREFERRED EMBODIMENTS

Figure 1:
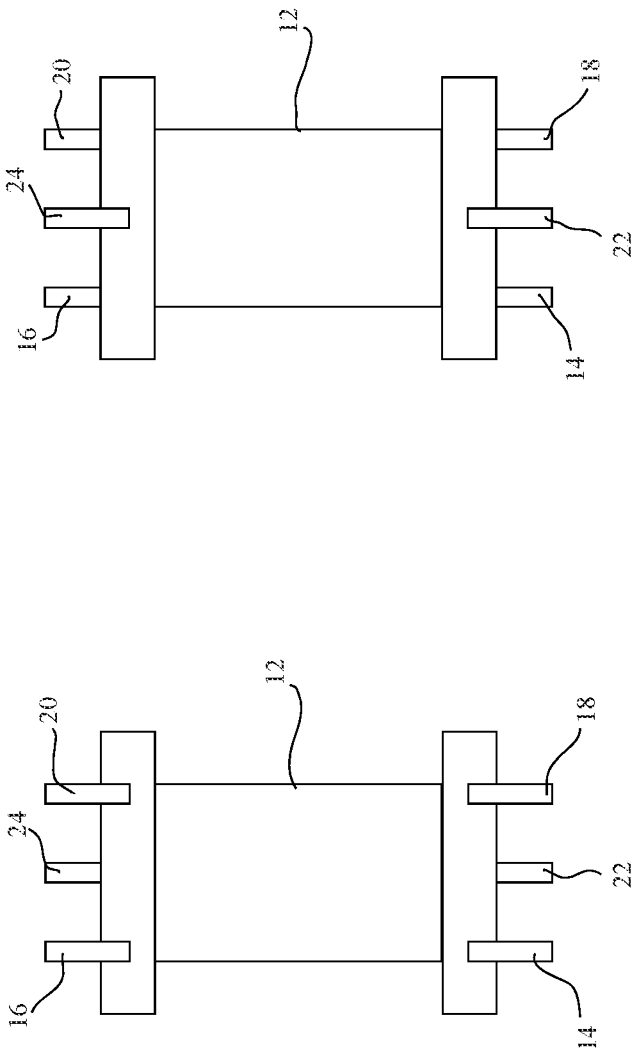
Fig. 1 (Prior art)
FIG. 1 shows a front view and a back view of a bobbin of a transformer.
Figure 3:
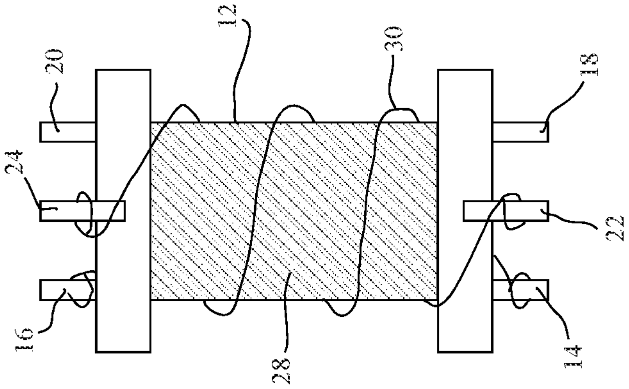
Fig. 3 (Prior Art)
FIGS. 2 to 4 show the traditional sandwich winding.
Figure 2:
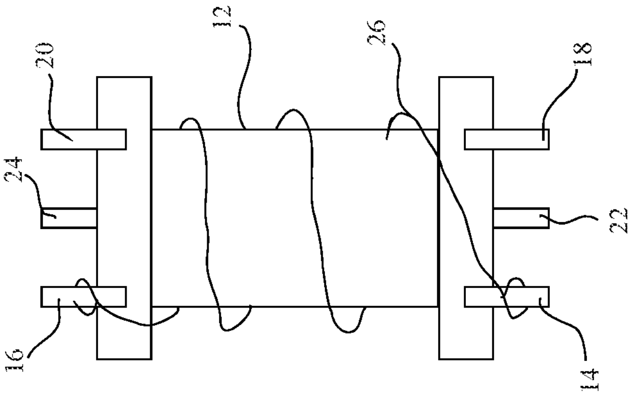
Fig. 2 (Prior Art)
Figure 5:
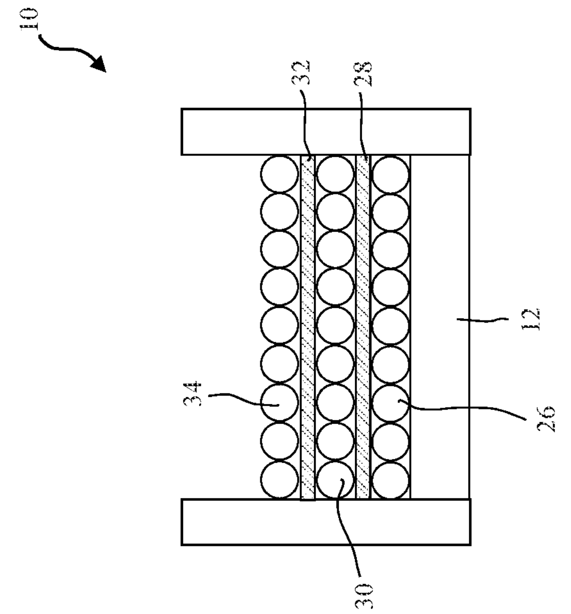
Fig. 5 (Prior Art)
FIG. 5 is a cross-section view of the transformer of FIG. 4.
Figure 8:
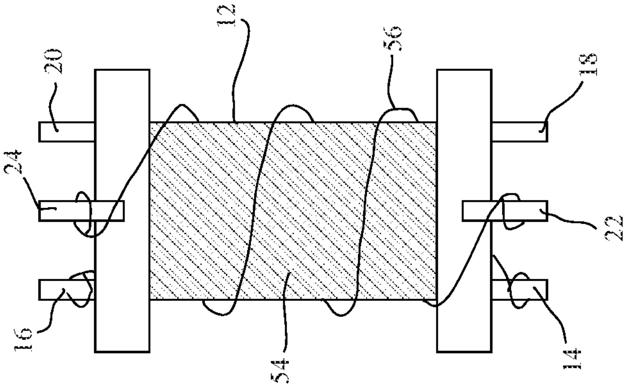
FIGS. 7 to 10 show a manufacturing method of the transformer of the present invention.
Figure 7:
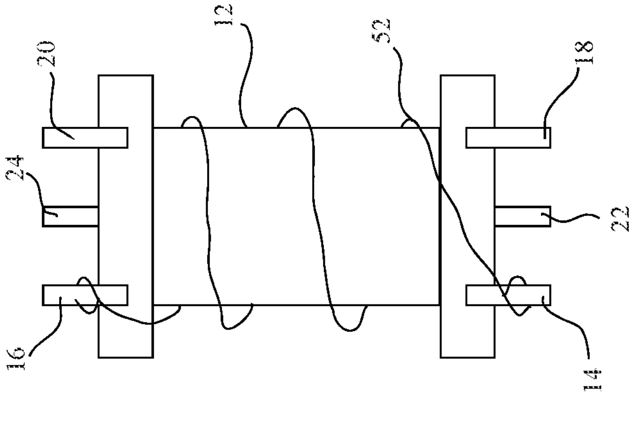
Figure 10:
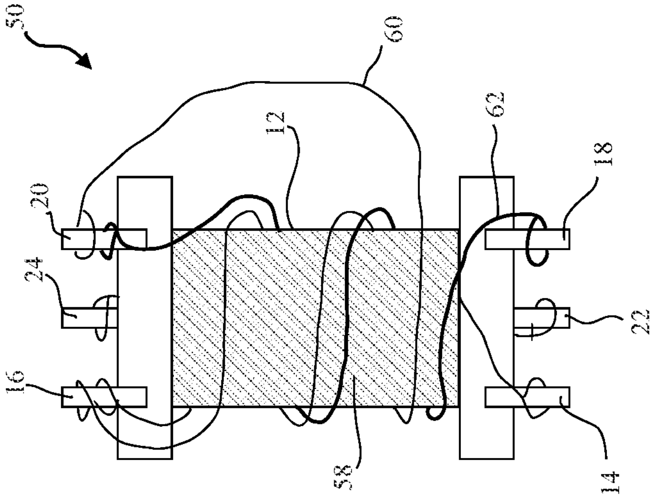
Figure 9:
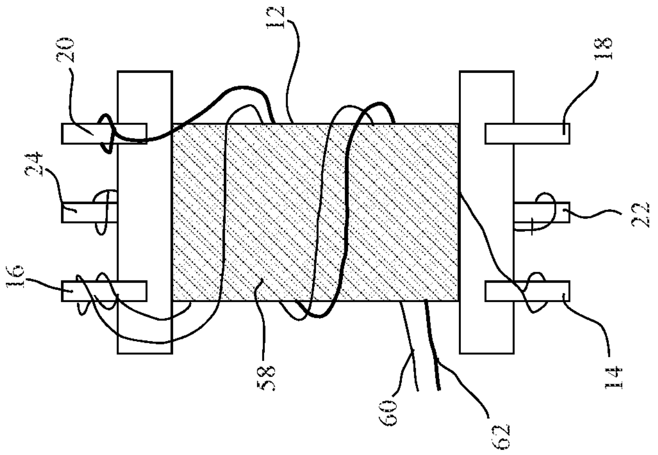
Figure 11:
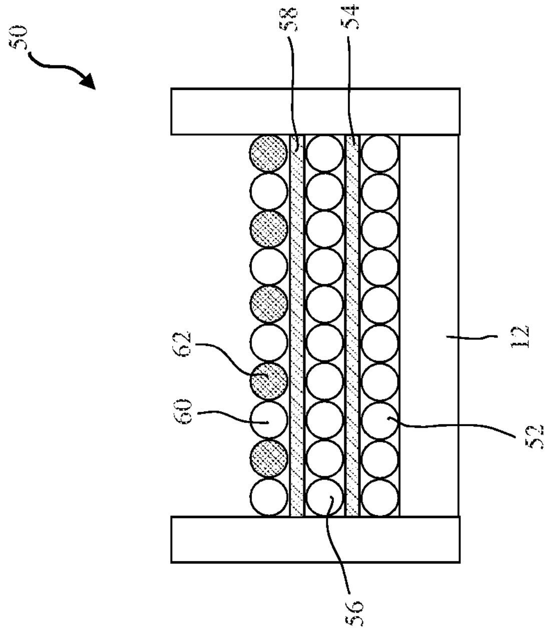
FIG. 11 is a cross-section view of the transformer of the present invention.

FIGS. 7 to 10 show a manufacturing method of a transformer 50 of the present invention. FIG. 11 is a cross-section view of the transformer 50 of the present invention. As shown in FIG. 1, a bobbin 12 of the transformer has a first pin 14, a second pin 16, a sixth pin 18, a fifth pin 20, a fourth pin 22 and a third pin 24. After one end of a first winding wire 52 is connected to the first pin 14, the first winding wire 52 is wound around the bobbin 12 for at least one turn, as shown in FIGS. 7 and 11. After the first winding wire 52 is wound around the bobbin 12 for a preset number of turns, the other end of the first winding wire 52 is connected to the second pin 16. Subsequently, as shown in FIGS. 8 and 11, after the first winding wire 52 is wound, an insulation material 54 such as an adhesive insulation tape is arranged on the first winding wire 52 on the bobbin 12. After the insulation material 54 is arranged, one end of a second winding wire 56 is connected to the third pin 24, and the second winding wire 56 is wound around the bobbin 12 for at least one turn. The first winding wire 52 is separated from the second winding wire 56 by the insulation material 54. After the second winding wire 56 is wound around the bobbin 12 for a preset number of turns, the other end of the second winding wire 56 is connected to the fourth pin 22. After the second winding wire 56 is wound, an insulation material 58 such as an adhesive insulation tape is arranged on the second winding wire 56 on the bobbin 12. As shown in FIGS. 9 and 11, after the insulation material 58 is arranged, one end of a third winding wire 60 is connected to the second pin 16, and simultaneously one end of forth winding wire 62 is connected to the fifth pin 20. Then, the third winding wire 60 and the forth winding wire 62 are wound in parallel around the bobbin 12 for at least one turn. The second winding wire 56 is separated from the third winding wire 60 and the forth winding wire 62 by the insulation material 58. Finally, as shown in FIG. 10, after the third winding wire 60 and the forth winding wire 62 are wound in parallel around the bobbin 12 for a preset number of turns, the other end of the third winding wire 60 is connected to the fifth pin 20 and the other end of the forth winding wire 62 is connected to the sixth pin 18 to form the transformer 50. In the transformer 50, the first winding wire 52, the third winding wire 60 and the forth winding wire 62 are connected in series to form a primary coil of the transformer 50, and the second winding wire 56 forms a secondary coil of the transformer 50.

Figure 12:
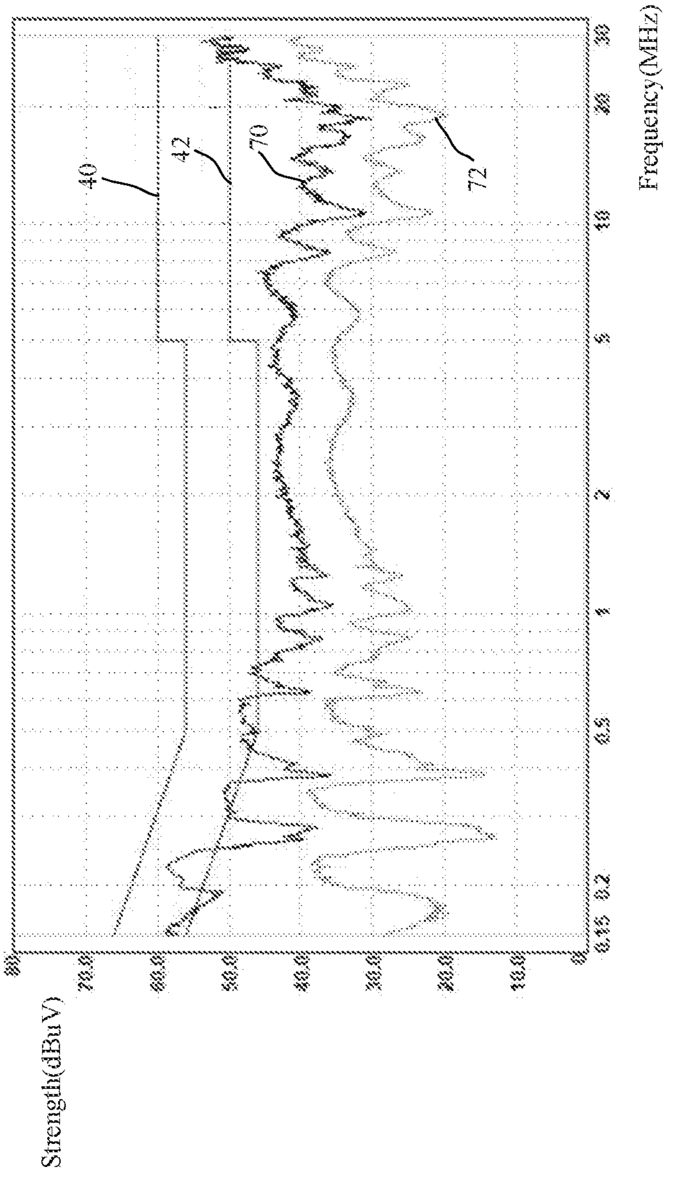
FIG. 12 shows EMI strength curves of the transformer of the present invention.

For the sandwich winding of the present invention, when a coil of a third layer is being formed, the third winding wire 60 and the forth winding wire 62 are firstly wound in parallel, and then the third winding wire 60 and the forth winding wire 62 are connected in series; in the way, the EMI performance of the transformer 50 may be improved. As shown in FIG. 12, an EMI quasi-peak strength curve 70 generated from the transformer 50 of the present invention is lower than a regulation line 40 of CISPR22 Class-B (QP), EE55022 Class-B (QP) or EE55032 Class-B (QP), and an EMI average strength curve 72 generated from the transformer 50 of the present invention is also lower than a regulation line 42 of CISPR22 Class-B (AV), EE55022 Class-B (AV) or EE55032 Class-B (AV).

Figure 4:
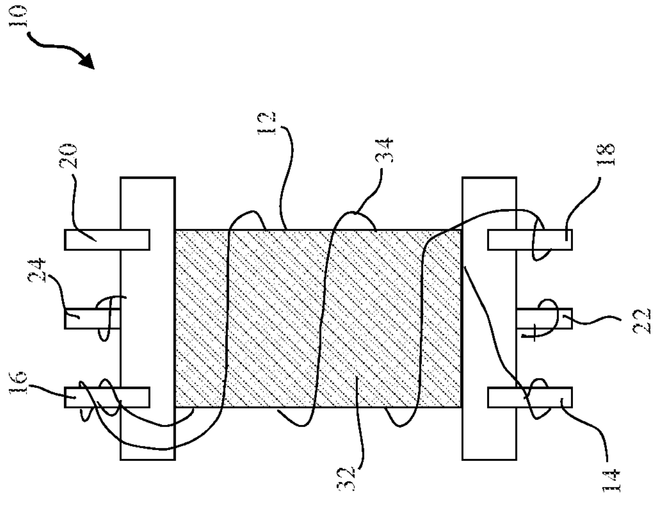
Fig. 4 (Prior Art)
Figure 6:
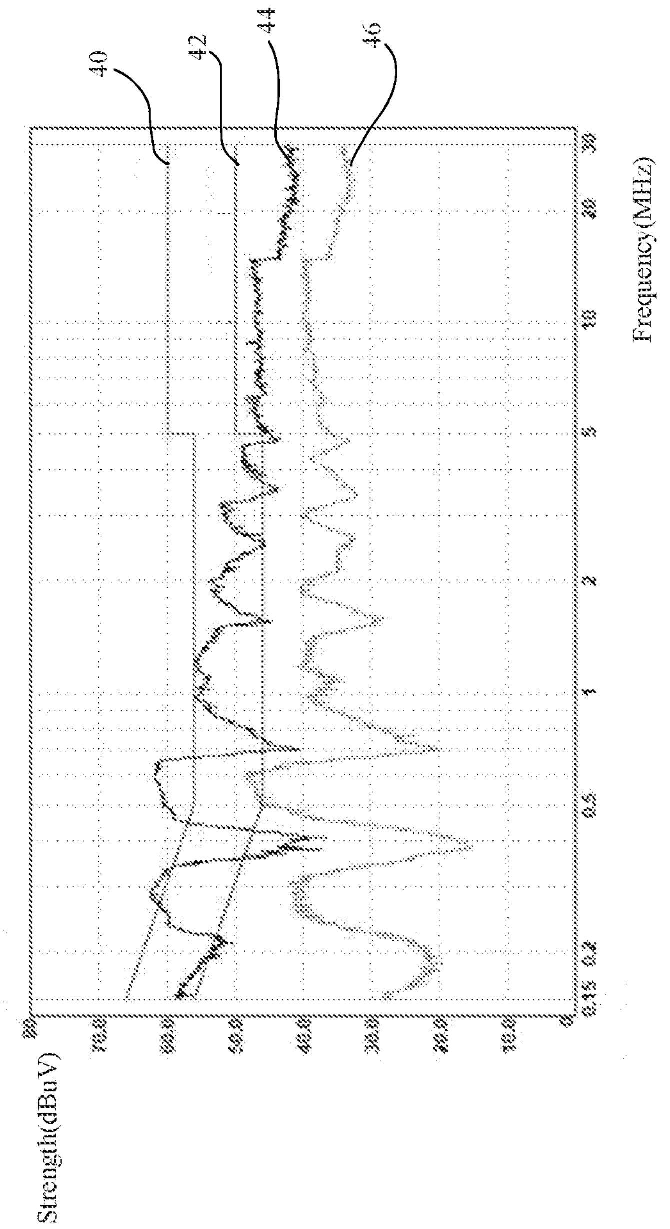
Fig. 6 (Prior Art)
FIG. 6 is EMI strength curves of the transformer of FIG. 4.

In addition, in the present invention, the method for winding the third winding wire 60 and the forth winding wire 62 in parallel is helpful to manufacturing the transformer. For example, in case of the preset number of turns being 12, the traditional method shown in FIG. 4 requires winding the winding wire 34 for 12 turns, so that the time for winding may be longer. However, the method of the present invention only requires winding the third winding wire 60 and the forth winding wire 62 for 6 turns, so that the time for winding may be shortened.

What is described above is only the embodiments of the present invention but does not limit the present invention in any form. The embodiments are used to disclose the present invention as above but not to limit the present invention. Those skilled in the art may utilize the disclosed technical contents to make some alterations and modifications as equivalent embodiments of equal changes without departing form the scope of the technical scheme of the present invention and any simple alterations, equivalent changes and modifications made according to the technical essence of the present invention without departing from the technical contents of the present invention should be contained in the scope of the technical solution of the present invention.

What is claimed is:

1. A manufacturing method of a transformer, comprising the steps of:

connecting one end of a first winding wire to a first pin of a bobbin;

connecting the other end of the first winding wire to a second pin of the bobbin after winding the first winding wire around the bobbin for at least one turn;

connecting one end of a second winding wire to a third pin of the bobbin;

connecting the other end of the second winding wire to a fourth pin of the bobbin after winding the second winding wire around the bobbin for at least one turn;

connecting one end of a third winding wire to the second pin of the bobbin, and connecting one end of a fourth winding wire to a fifth pin of the bobbin; and connecting the other end of the third winding wire to the fifth pin of the bobbin and connecting the other end of the fourth winding wire to the sixth pin of the bobbin after winding the third winding wire and the fourth winding wire around the bobbin in parallel for at least one turn;

wherein the first winding wire, the third winding wire and the fourth winding wire form a primary coil of the transformer, and the second winding wire is a secondary coil of the transformer.

2. The manufacturing method according to claim 1, further comprising:

arranging a first insulation material on the first winding wire after completing winding the first winding wire; and arranging a second insulation material on the second winding wire after completing winding the second winding wire.

* * * * *